(12) United States Patent
Kim et al.

(10) Patent No.: US 8,302,236 B2
(45) Date of Patent: Nov. 6, 2012

(54) BOARDING BRIDGE WITH AIR CONDITIONER FACILITY

(75) Inventors: Ju Ryong Kim, Seoul (KR); Jong Hoon Lee, Seoul (KR)

(73) Assignee: Otis Elevator Company, Farmington, CT (US)

( * ) Notice: Subject to any disclaimer, the term of this patent is extended or adjusted under 35 U.S.C. 154(b) by 50 days.

(21) Appl. No.: 12/747,239

(22) PCT Filed: Dec. 19, 2008

(86) PCT No.: PCT/US2008/087554
§ 371 (c)(1),
(2), (4) Date: Jun. 10, 2010

(87) PCT Pub. No.: WO2009/086025
PCT Pub. Date: Jul. 9, 2009

(65) Prior Publication Data
US 2010/0269272 A1    Oct. 28, 2010

(30) Foreign Application Priority Data
Dec. 21, 2007  (KR) ........................ 10-2007-0135534

(51) Int. Cl.
*E01D 1/00* (2006.01)
(52) U.S. Cl. .......................................... 14/71.5; 14/72.5
(58) Field of Classification Search .................. 14/69.5, 14/71.1, 71.5, 72.5, 71.3, 71.7
See application file for complete search history.

(56) References Cited

U.S. PATENT DOCUMENTS

| | | | | |
|---|---|---|---|---|
| 3,399,545 A | * | 9/1968 | Anderson et al. | 62/237 |
| 4,357,860 A | * | 11/1982 | Krzak | 454/71 |
| 4,526,090 A | * | 7/1985 | Maier | 454/119 |
| 4,543,677 A | * | 10/1985 | Haglund et al. | 14/71.5 |
| 4,572,550 A | * | 2/1986 | Harder | 285/47 |

(Continued)

FOREIGN PATENT DOCUMENTS
EP    0205314 A1    6/1986
(Continued)

OTHER PUBLICATIONS

International Preliminary Report on Patentability for International application No. PCT/US2008/087554 mailed Jul. 1, 2010.

(Continued)

*Primary Examiner* — Robert Pezzuto
*Assistant Examiner* — Matthew D Troutman
(74) *Attorney, Agent, or Firm* — Carlson, Gaskey & Olds PC

(57) ABSTRACT

A mobile boarding bridge (101) is equipped with climate control facilities. The mobile boarding bridge is furnished with multiple collapsible tunnels (110, 120). A heating/cooling device (160) comprising a climate controller (161) generates hot or cold air and is furnished on the outside of the first tunnel (110) of said tunnels. A connection pipe (163) that connects to ducts (164) within the tunnel is attached to said climate controller (161). A duct (164) connected to said connection pipe (163) directs air that has been heated/cooled by the heating-cooling device (160) to the interior of the first tunnel (110). An aspirator comprises an air intake (171) which intakes air from the interior of the tunnel and an intake pipe (172) which leads air taken in at said air intake (171) to the interior of the climate controller (161).

3 Claims, 5 Drawing Sheets

U.S. PATENT DOCUMENTS

| | | | | |
|---|---|---|---|---|
| 4,620,339 A | * | 11/1986 | Shepheard | 14/71.5 |
| 4,712,339 A | * | 12/1987 | Wenham et al. | 14/71.5 |
| 4,715,077 A | * | 12/1987 | Shepheard | 14/71.5 |
| RE32,687 E | * | 6/1988 | Shepheard | 14/71.5 |
| 4,835,977 A | * | 6/1989 | Haglund et al. | 62/89 |
| 5,226,204 A | * | 7/1993 | Schoenberger et al. | 14/71.5 |
| 5,383,335 A | * | 1/1995 | Anderson et al. | 62/89 |
| 5,385,020 A | * | 1/1995 | Gwilliam et al. | 62/3.7 |
| 5,431,021 A | | 7/1995 | Gwilliam et al. | |
| 5,715,701 A | * | 2/1998 | Kreymer | 62/419 |
| 6,272,880 B1 | | 8/2001 | Miki et al. | |
| 6,378,317 B1 | | 4/2002 | Ribo | |

FOREIGN PATENT DOCUMENTS

EP    0294729 A2    12/1988

OTHER PUBLICATIONS

International Search Report and Written Opinion of the International Searching Authority for International application No. PCT/US2008/087554 mailed Jul. 28, 2009.

\* cited by examiner

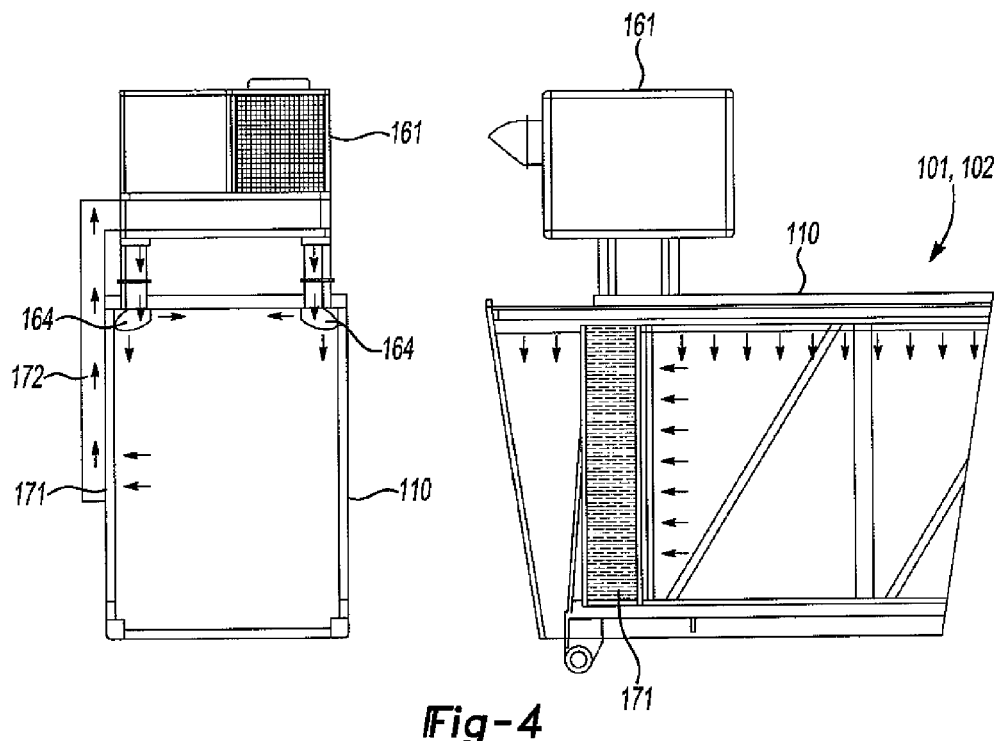
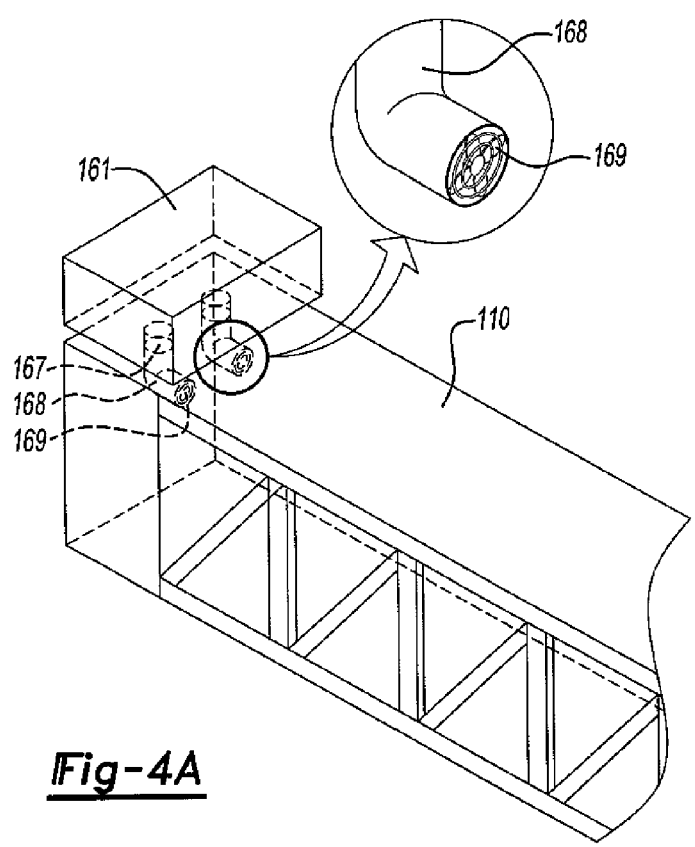
Fig-4
Fig-4A

US 8,302,236 B2

BOARDING BRIDGE WITH AIR CONDITIONER FACILITY

TECHNICAL FIELD

The present invention concerns a mobile boarding bridge equipped with climate-control facilities.

Specifically, the present invention pertains to a mobile boarding bridge that connects an airport terminal to an aircraft, and specifically a mobile boarding bridge furnished with climate-control facilities so that passengers can feel refreshed by furnishing a mobile boarding bridge furnished with multiple collapsible tunnels, which enable passengers boarding an airplane to move directly from the airport building interior to the aircraft, with climate-control facilities.

DESCRIPTION OF THE RELATED ART

FIG. 1 presents a front view of a mobile boarding bridge furnished with a 2-tunnel climate controller of the prior art; FIG. 2 shows a mobile boarding bridge furnished with a 3-tunnel climate controller of the prior art; and FIG. 2b shows a conceptual diagram of a mobile boarding bridge furnished with a 3-tunnel climate controller according to the prior art.

As shown in these diagrams, a 2-tunnel mobile boarding bridge (1) is configured to include a first tunnel (10), a second tunnel (20), and a rotunda (40) which connects said first tunnel (10) to the airport terminal, as well as a cabin (50) which connects said second tunnel (20) to the aircraft door.

Also, a 3-tunnel mobile boarding bridge (2) is configured to include three collapsible tunnels, the first tunnel (10), second tunnel (20), and third tunnel (30), a rotunda (40) which connects said first tunnel (10) to the airport terminal, and a cabin (50) which connects said third tunnel (30) to the aircraft boarding door.

Because ordinary tunnels are fashioned primarily from metal components, when the temperature outside the airport is high, the tunnel interior becomes much hotter than the average airport temperature; likewise, when the temperature outside the airport is very low, the passengers boarding the aircraft may feel intense cold.

To resolve the above-described problems, a mobile boarding bridge is proposed which is furnished with a heating/cooling device for heating/cooling the interior of the tunnel.

This has enabled a comfortable temperature to be maintained within each tunnel; in cases such as those illustrated by FIG. 1, by heating or cooling the interior of the tunnel by furnishing multiple climate controllers (60) on the upper part of the second tunnel (20) and operating the climate controllers (60); and in cases such as those illustrated by FIG. 2, by heating or cooling the interior of the tunnel by furnishing the upper part of the third tunnel (30) with multiple climate controllers (60).

However, when the above-mentioned method was followed, there was the problem that because only the aircraft boarding-door side of the tunnel, i.e., the interior of the second tunnel (20) in FIG. 1 and of the third tunnel (30) in FIG. 2, was heated or cooled, the interiors of the other tunnels were not heated properly.

This occurred because since the above-mentioned boarding bridges with first through third tunnels (30) must be moved to the location of the aircraft to be boarded while they are collapsed lengthwise and only extended afterwards, the climate controllers (60) could only be installed on the second tunnel (20) of a 2-tunnel boarding bridge (1) or the third tunnel (30) of a 3-tunnel mobile boarding bridge (2).

In other words, if the first tunnel (10) of the 2-tunnel bridge shown in FIG. 1 were also furnished with a climate control device (60) like that furnished on the second tunnel (20), if said tunnel were collapsed, the climate controller (60) furnished on the first tunnel (10) would be destroyed by the second tunnel (20); likewise, if the first and second tunnels (10, 20) were also furnished with a climate controller (60) like that furnished on the third tunnel (30), then for the same reason, these climate controllers (60) would also be destroyed as shown in FIG. 2b.

Moreover, since it is not possible for a large aircraft to be parked very close to the airport terminal, a 3-tunnel mobile boarding bridge would be preferable to a 2-tunnel bridge, but since the amount of unheated/uncooled space is greater than for the 2-tunnel bridge, passengers boarding the aircraft between the airport terminal and the third tunnel (30) must board under uncomfortable conditions.

SUMMARY

An exemplary mobile boarding bridge is furnished with climate controllers that can heat/cool the entire tunnel interior of both 2-tunnel and 3-tunnel mobile boarding bridges.

An exemplary collapsible mobile boarding bridge that is furnished with climate-control facilities, including a climate controller furnished on the outside of the first tunnel or inwardmost tunnel of the aforementioned tunnels which generates hot and cold air; a connecting pipe that is attached to said climate controller and that connects to the duct on the interior of the tunnel; and a duct connected to said connecting pipe that leads air heated/cooled by the climate controller to the interior of the first tunnel.

In addition, said heating/cooling device can be configured with a climate controller that is furnished on the outside of the first tunnel or inwardmost tunnel of the aforementioned tunnels and that generates hot and cold air; a connecting pipe that is attached to said climate controller and that connects to the interior of the tunnel; an air outlet pipe that connects from the end of said connecting pipe to the interior of the first tunnel, and a fan furnished at the end of said air outlet pipe.

In addition, it can be configured so as to additionally include an aspirator comprising an air intake that takes in air from the interior of the tunnel in the aforementioned mobile boarding bridge, and an intake pipe wherein the air taken in from said intake is directed by a fan to the interior of the climate controller.

Furthermore, said climate controller can be furnished on the rotunda end in the upper part of the first tunnel; the aforementioned duct can be formed either lengthwise along the top of the interior of the first tunnel or in plural lengthwise locations in both corners of the top of the interior of the first tunnel.

Additionally, it is also possible to furnish multiple air outlets for heating/cooling inside the first tunnel or to furnish said air outlets with a grill pattern and a structure that enables open/close adjustment of heating/cooling; it is also possible to furnish additional air outlets on the aforementioned second tunnel side directed towards said second tunnel.

Also, the aforementioned air intake can be furnished vertically as multiple units on either side of the rotunda end of the first tunnel, or a filter can also be installed between the air intake and the intake pipe in the aforementioned aspirator.

If the present invention is followed, a comfortable environment can be provided to the tunnel interior regardless of the outside weather by providing appropriate heating or cooling to the entire tunnel interior, so that passengers can be content while boarding the aircraft or moving from the aircraft to the airport gate via the mobile boarding bridge.

In addition, it has the effect of enabling heating and cooling of the entire tunnel, even in the case of long 2- or 3-tunnel boarding bridges such as are used when boarding large aircraft, by enabling heating/cooling of the entire tunnel interior.

Hereinbelow, preferred embodiments of the present invention are described in detail with reference to the attached diagrams.

As shown in these figures, the mobile boarding bridges that connect airport gates to aircraft are furnished with multiple tunnels; depending on the aircraft location and whether boarding is underway, they can either be extended lengthwise or collapsed.

The various features and advantages of this invention will become apparent to those skilled in the art from the following detailed description. The drawings that accompany the detailed description can be briefly described as follows.

BRIEF DESCRIPTION OF THE DRAWINGS

FIG. 4 is an end and front cross section of the first tunnel.

FIG. 4a: FIG. 4a is an exploded oblique view of a mobile boarding bridge furnished with a climate-control facility, according to another embodiment of the present invention.

DETAILED DESCRIPTION

Figure 1:
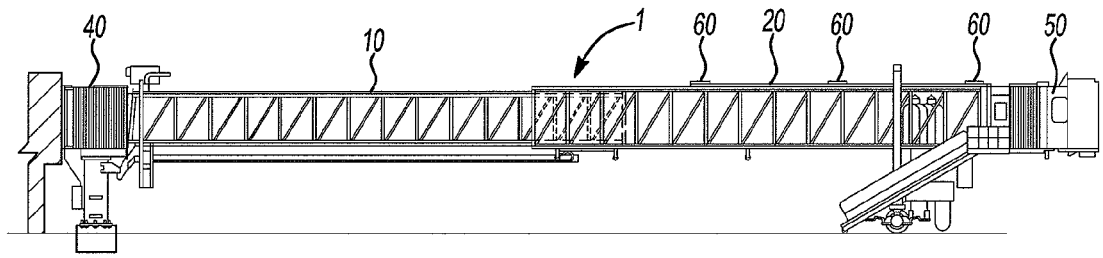
FIG. 1 is a front view of a mobile boarding bridge furnished with a 2-tunnel climate-control device based on the prior art.

A 2-tunnel mobile boarding bridge (101) comprises a first tunnel (110), second tunnel (120), rotunda (140), and cabin (150); a 3-tunnel boarding bridge (102) comprises a first tunnel (11), second tunnel (120), third tunnel (130), rotunda (140), and cabin (150).

In this case, when the 2-tunnel boarding bridge is collapsed into its shortened form, the interior of the aforementioned second tunnel (120) is collapsed so as to surround the exterior of the first tunnel (110). Additionally, when a 3-tunnel boarding bridge is collapsed into its shortened form, the interior of the third tunnel (130) is collapsed so as to surround the outside of the second tunnel (120), and the interior of the second tunnel (120) is collapsed so as to surround the outside of the first tunnel (110). Thus, the cross section of the third tunnel (130) forms a larger rectangle than the second tunnel (120), and the cross section of the second tunnel (120) forms a larger rectangle than the first tunnel (110).

Figure 2:
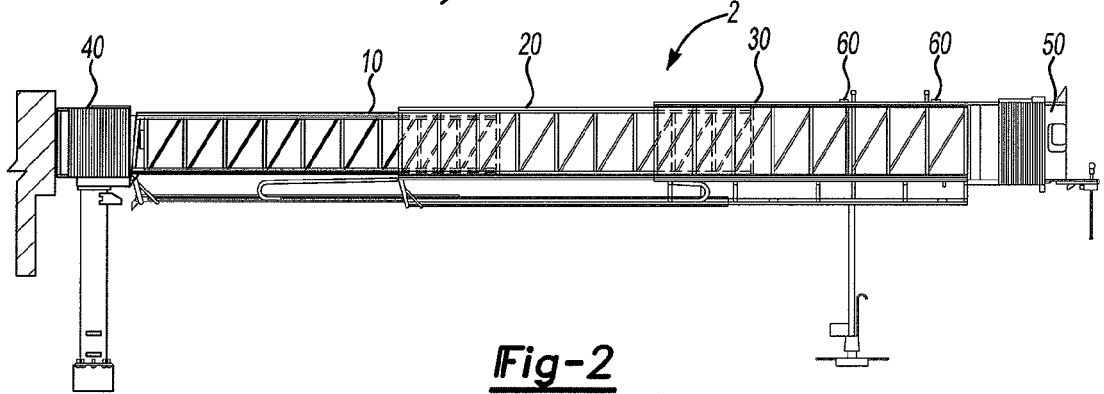
FIG. 2 is a front view of a mobile boarding bridge furnished with a 3-tunnel climate-control device based on the prior art.
Figure 2B:
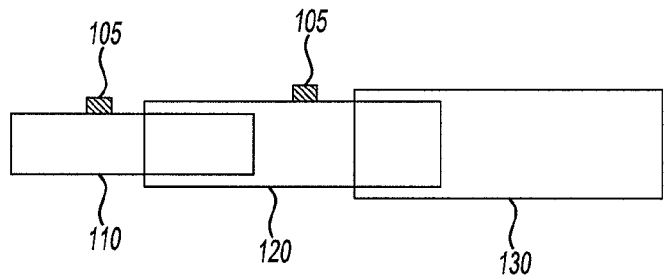
FIG. 2b is a conceptual diagram of a mobile boarding bridge furnished with a 3-tunnel climate-control device based on the prior art.
Figure 3:
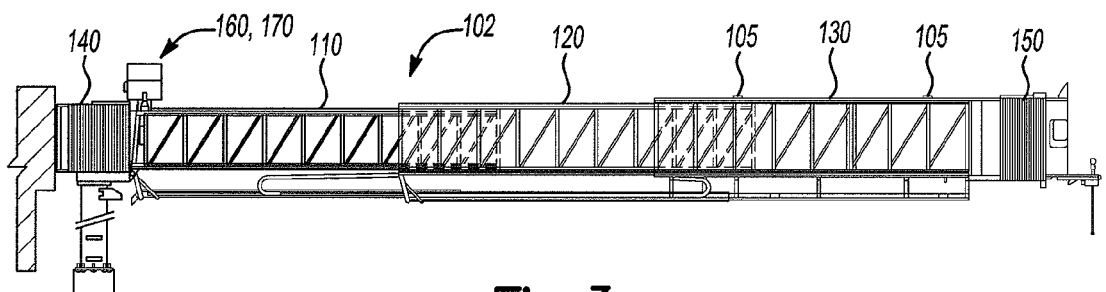
FIG. 3 is a front view of a mobile boarding bridge furnished with a climate-control facility, according to one embodiment of the present invention.

As shown in FIGS. 1 and 2 above, in the case of a 2-tunnel mobile boarding bridge (101), a climate controller (105) is furnished attached to the roof of the second tunnel (120); in the case of a 3-tunnel mobile boarding bridge (102), it is furnished attached to the roof of the third tunnel (130).

This is because when a 2-tunnel mobile boarding bridge (101) is collapsed, the first tunnel (110) enters the second tunnel (120); thus, the climate control device of the type furnished on the roof of the second tunnel (120) cannot be furnished on the roof of the first tunnel (110).

Additionally, when a 3-tunnel mobile boarding bridge (102) is collapsed, because the first tunnel (110) enters the second tunnel (120) and the second tunnel (120) enters the third tunnel (130), the first tunnel (110) and second tunnel (120) cannot be furnished with the tunnel-roof-mounted climate controller (105) that is furnished on the roof of the third tunnel (130).

Therefore, the first tunnel (110) cannot be furnished with a tunnel-roof-mounted climate controller (105) of the type that is furnished on a 2-tunnel or 3-tunnel mobile boarding bridge, and a special type of heating/cooling device (160) must be provided.

Said heating/cooling device (160) is furnished with a climate controller (161) on the roof of the first tunnel (110) and includes a connecting pipe (163) for moving air that has been heated/cooled by said climate controller (161) to the tunnel interior, and a duct (164) that is formed in the interior of the tunnel is connected to said connecting pipe (163). A fan can also be furnished between said connecting pipe (163) and duct (164) in order to blow air towards the duct (164).

To describe the method of heating/cooling the tunnel interior in detail: a climate controller (161) that generates hot or cold air is furnished on the outside of the first tunnel (110), and a fan is furnished in contact with said climate controller (161). Said fan plays both the role of moving air that has been heated or cooled by the climate controller (161) toward the connecting pipe (163) and of enabling the re-entry of tunnel air into the climate controller (161) via the air intake (171) and intake pipe (172). Said fan is typically furnished together with the climate controller.

Said climate controller (161) is furnished on the roof of the first tunnel (110) and must be furnished in a location such that it will not be damaged when the first tunnel (110) and second tunnel (120) are collapsed. Ordinarily, when the first tunnel (110) and second tunnel (120) are collapsed, said first tunnel (110) is not entirely inserted into the second tunnel (120), but rather part of the first tunnel (110), i.e., part of the rotunda (140) end of the first tunnel (110), is not fully inserted into the second tunnel (120) when the first tunnel (110) and second tunnel (120) are collapsed.

FIG. 4 shows the air heated/cooled by the climate controller being sent into the interior of the first tunnel.

The air generated by said climate controller (161) is sent by the fan to the connecting pipe (163). Thus, hot or cold air generated by the climate controller (161) is sent via said connecting pipe (163) into the tunnel interior; said connecting pipe (163) is connected to the climate controller (161) and divides into two branches, coupling to holes (167) formed in the roof of the first tunnel (110) so as to connect with the duct (164) that is furnished in the interior of the first tunnel (110). It is configured in this fashion because if a large climate controller (161) were to be attached firmly and directly to the roof of the first tunnel (110), the collapsing of the second tunnel (120) and first tunnel (110) would damage the climate controller (161).

In addition, said pipe is coupled to the holes (167) in the roof of the first tunnel (110); the hole (167) in the roof of said first tunnel (110) should be furnished in a location that will not create interference from the second tunnel (120) when the second tunnel (120) is collapsed.

The duct (164) is connected to the aforementioned connecting pipe (163). Said duct (164) is formed in the interior of the first tunnel (110) and should be furnished lengthwise in either corner of the upper part of the first tunnel (110).

Said duct (164) is shown in the figures in a cross sectional shape resembling a square rugby ball, but in the above-described case it can be furnished with various other shapes, such as round and rectangular.

It is preferred that said duct (164) run along the top of the first tunnel (110) from one end to the other. Specifically, in the first tunnel (110) a rotunda (140) direction and second tunnel (120) direction are furnished; it should preferably extend lengthwise from said rotunda (140) end to the second tunnel (120) end.

It is also preferred that said duct (164) be furnished with multiple outlets (165) within said duct (164) in order to heat/cool the interior of the first tunnel (110). If an outlet (165) is furnished only at the end of the duct (164), it will be quite impossible to have heating/cooling effects along the entire length of the first tunnel (110).

Also, said air outlet (165) is furnished in the form of a grill and should preferably be furnished in a structure that can be opened and closed so as to adjust the heating/cooling. The furnishing of said air outlet (165) in grill form is in order to move a larger quantity of heated/cooled air into the tunnel interior; the mounting of an opening/closing device on said grill-type outlet (165) is in order to adjust the amount of air moving to the interior of the tunnel when excessive heating/cooling has caused the tunnel interior to become too hot or too cold.

The operation of the opening/closing device furnished in said outlet (165) can be furnished in various ways that allow opening and closing, such as manual opening/closing or opening/closing through real-time sensing of the indoor air temperature.

In FIG. 4a, another embodiment of the present invention is shown, different from that shown in FIG. 4 above, wherein the heated/cooled air from the climate controller is sent to the interior of the first tunnel by an air outlet pipe and fan.

Thus, the heated/cooled air from said climate controller (161) is sent to the connecting pipe (163) and the cross sectional shape of the end of said end of said connecting pipe is furnished with an L-shaped outlet (168); said air outlet (168) is furnished to the interior of the first tunnel. Also, a fan (169) can additionally be furnished at the end of said outlet pipe (168) which can move the heated/cooled air to the interior of the first tunnel, so that the heated/cooled air can move from the rotunda end of the first tunnel toward the second tunnel.

Figure 4B:
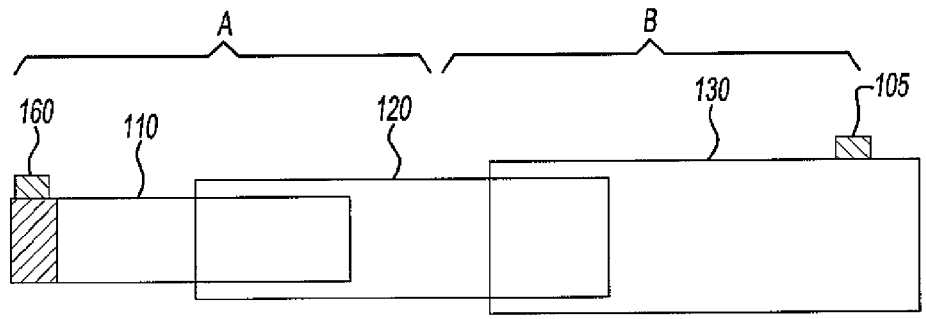
FIG. 4b is a conceptual diagram of the heating/cooling area based on the present invention.
Figure 5:
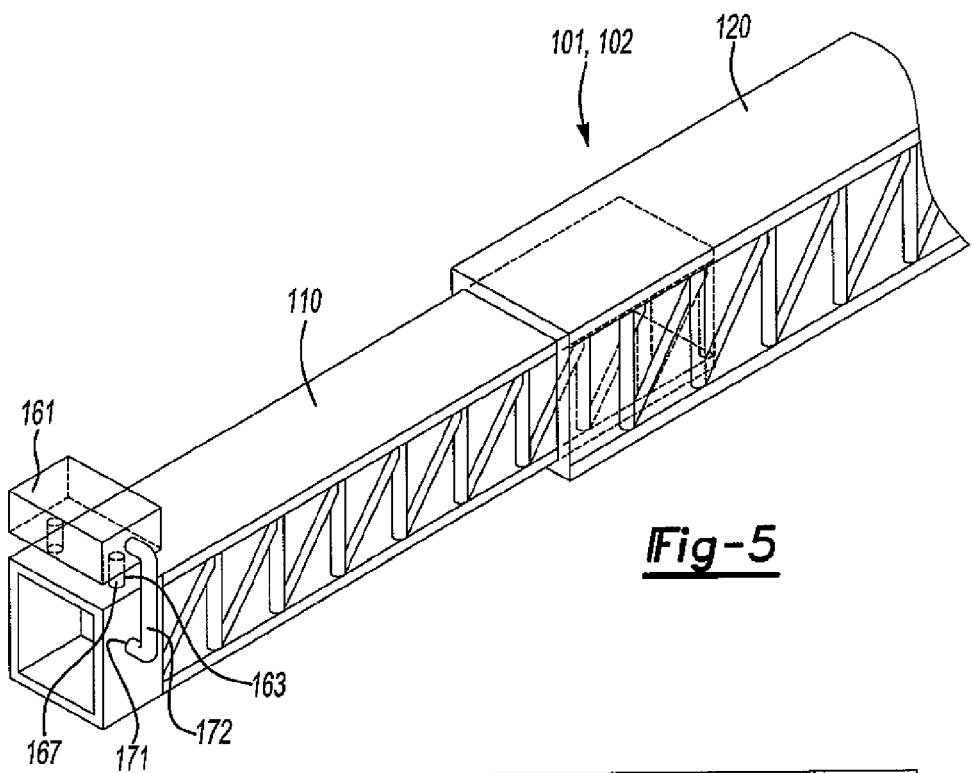
FIG. 5 is a schematic diagram of the climate-control facility installed in the first tunnel.
Figure 6:
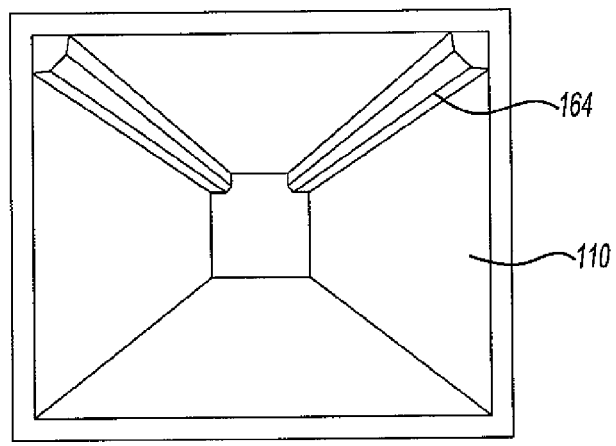
FIG. 6 is a diagram of the first tunnel as seen from the second tunnel.
Figure 7:
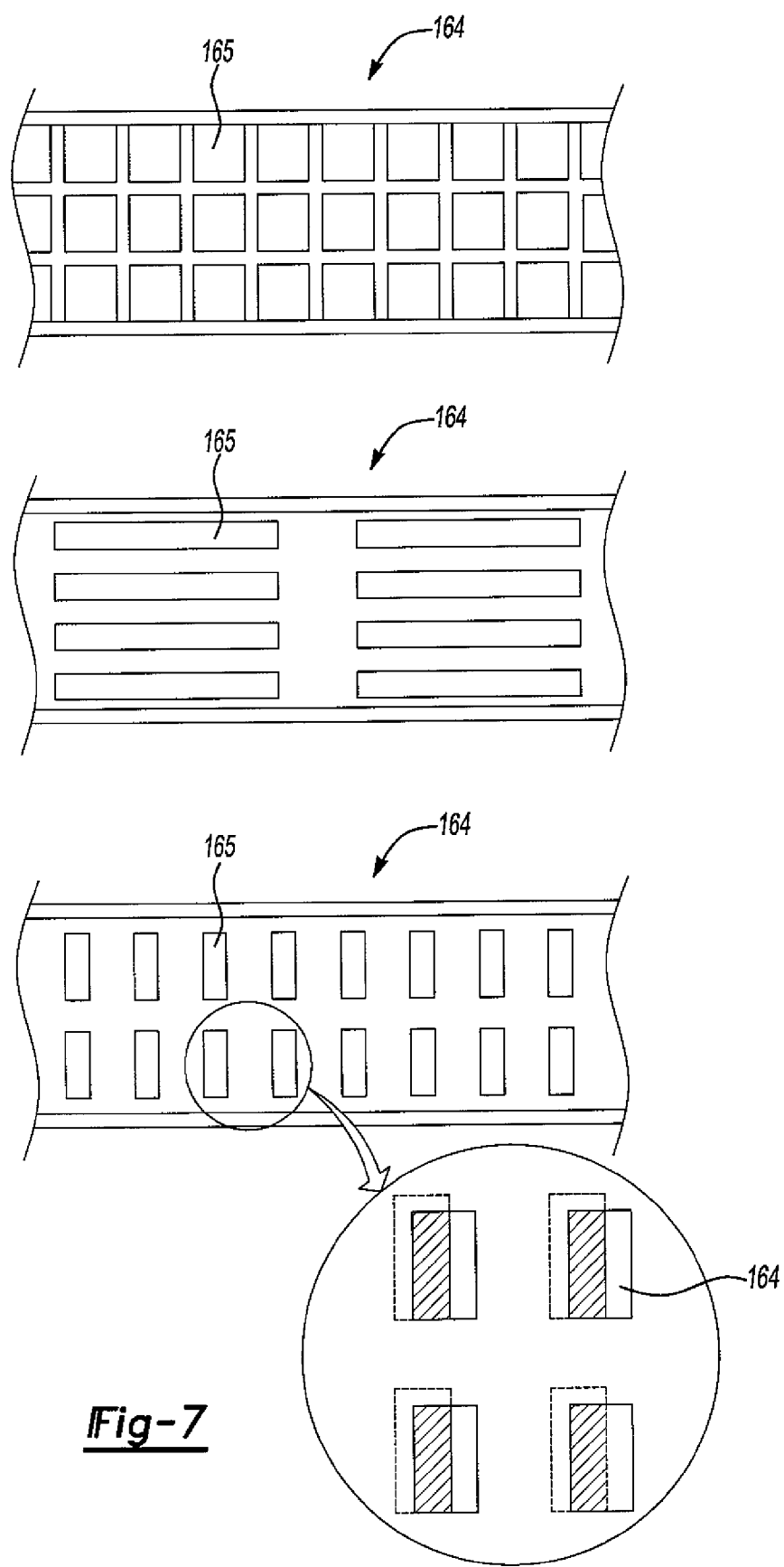
FIG. 7 is a diagram showing several embodiments of the air outlet vent furnished on the duct.
Figure 8:
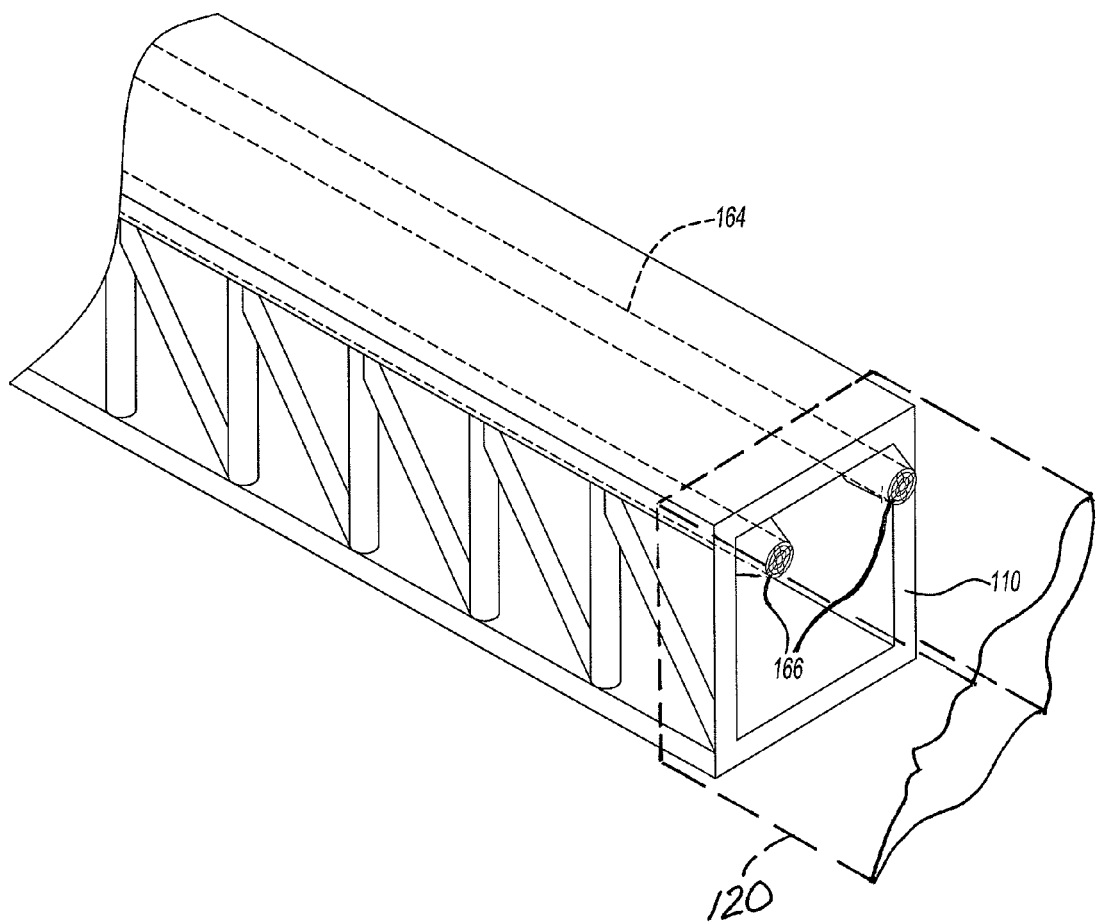
FIG. 8 is a diagram showing the projecting part of the end of the air outlet vent.

If the scheme of FIGS. 4 and 4a is followed, then as shown in FIG. 4b, the area A is heated/cooled by the heating/cooling facility (160) of the first tunnel and the area B is heated/cooled by the climate controller (105) mounted on the roof of the third tunnel.

In the case of an ordinary 2-tunnel mobile boarding bridge (101), heating/cooling is provided in the second tunnel (120) by a climate-control apparatus (105) that is ordinarily roof-mounted, and in the first tunnel (110) by the heating/cooling facility of the present invention.

In the case of an ordinary 3-tunnel mobile boarding bridge (102), heating/cooling is provided in the third tunnel (130) by an ordinary climate-control apparatus, and in the first tunnel (110) by the heating/cooling facility of the present invention. Specifically, heating/cooling apparatus (160, 105) are installed on the roofs of the first tunnel (110) and third tunnel (130) respectively; the heated/cooled air supplied by each heating/cooling apparatus (160, 105) is used to effect the heating/cooling not only of the interior of the first (110) and third (130) tunnels, but also of the entire second tunnel (120).

Thus, a comfortable environment can be provided to passengers boarding and deboarding by means of the air that is supplied in the first and third tunnels (110, 130).

However, in order to provide more suitable heating/cooling in the second tunnel (120), the furnishing of an outlet (165) on the end of the duct (164) can be considered.

Even in the case of a 3-tunnel mobile boarding bridge, if the second tunnel (120) is not particularly long, then it is not a particularly serious problem if said second tunnel (120) is not properly heated/cooled; however, in the case of a large-scale mobile boarding bridge used for boarding large aircraft, the length of said second tunnel (120) alone may reach some 10 m, and the passengers may experience a certain temperature difference from one tunnel to another.

Therefore, it is preferable that a protruding outlet vent (165) also be furnished on the duct (164) furnished in the interior of the first tunnel (110) projecting in the direction of the connecting pipe (163) of said duct (164), and at the opposite end projecting in the direction of the second tunnel (120) so as to be able to send heated/cooled air toward the second tunnel. The protruding part (166) of the outlet vent (165) formed in the direction of said second tunnel (120) can also be furnished with an ordinary grill form.

In addition, in the first tunnel (110), an aspirator can also be furnished in addition to the above-described heating/cooling device. Said aspirator is composed of an air intake (171) and intake pipe (172). Said air intake (171) sends the tunnel air back to the climate controller (161), and provides air to be used for heating or cooling; the air being injected into the climate controller (161) can also be configured as outside air, but in this case, a great deal of energy is consumed for heating and cooling, and therefore it is furnished in the interior of the first tunnel (110) in order to be able to use the air from the tunnel interior that has a relatively similar temperature.

Specifically, said air intake is furnished in the interior of the first tunnel (110), and preferably vertically on either side of the entrance furnished for passengers at the rotunda (140) end of the first tunnel (110). The air entering from said air intake (171) re-enters the climate controller (161) after passing through the intake pipe (172).

The re-entry of said tunnel air into the climate controller (161) via the air intake (171) and intake pipe (172) is made possible by the action of the fan that is furnished at the bottom of the climate controller (161). It is preferred that a filter (if not already present) be furnished between said air intake (171) and intake pipe (172) so as to prevent contaminants such as dust from the tunnel interior from moving back into the tunnel interior via the climate controller (161).

The above-mentioned description applies to only one possible embodiment of the present invention, and the scope of the present invention is not limited by the above-mentioned embodiment; the technical scope of the present invention includes various alterations that can be made by a person of skill in the art of the field of the invention who has the benefit of this description without exceeding the scope of the claims that appear below.

We claim:

1. A collapsible mobile boarding bridge that is furnished with a climate-control facility, comprising:
   a first tunnel;
   a second tunnel into and out of which said first tunnel translates;

a climate controller that is furnished on the outside of said first tunnel and that generates at least one of hot and cold air;

a connecting pipe that is attached to said climate controller; and a duct connected to said connecting pipe, the duct directs air heated/cooled by the climate controller to the interior of the first tunnel, said duct extending parallel to a length of said first tunnel, said duct having a length corresponding to the length of said first tunnel, wherein the duct is formed lengthwise on an upper part of an interior of the first tunnel.

2. A collapsible mobile boarding bridge that is furnished with a climate-control facility, comprising:

a first tunnel;

a second tunnel into and out of which said first tunnel translates;

a climate controller that is furnished on the outside of said first tunnel and that generates at least one of hot and cold air;

a connecting pipe that is attached to said climate controller; and a duct connected to said connecting pipe, the duct directs air heated/cooled by the climate controller to the interior of the first tunnel, said duct extending parallel to a length of said first tunnel, said duct having a length corresponding to the length of said first tunnel, wherein the duct is formed in multiple units each extending lengthwise in a respective corner of the upper part of the interior of the first tunnel.

3. The mobile boarding bridge of claim 2, comprising a plurality of air-outlet vents on the duct to facilitate at least one of heating or cooling the first tunnel.

* * * * *